United States Patent
Liao

(10) Patent No.: US 7,213,830 B2
(45) Date of Patent: May 8, 2007

(54) DETACHABLE DEVICE FOR AUXILIARY WHEEL OF GOLF CART

(75) Inventor: Gordon Liao, Yung Kang (TW)

(73) Assignee: Unique Product & Design Co., Ltd, Tainan Hsien (TW)

( * ) Notice: Subject to any disclaimer, the term of this patent is extended or adjusted under 35 U.S.C. 154(b) by 227 days.

(21) Appl. No.: 10/983,408

(22) Filed: Nov. 8, 2004

(65) Prior Publication Data

US 2006/0097488 A1 May 11, 2006

(51) Int. Cl.
*B62B 3/00* (2006.01)
*B62B 7/02* (2006.01)

(52) U.S. Cl. .................. 280/651; 280/47.24; 280/47.26

(58) Field of Classification Search ............... 280/651, 280/47.26, 47.24, 47.38
See application file for complete search history.

(56) References Cited

U.S. PATENT DOCUMENTS

| | | | | |
|---|---|---|---|---|
| 4,759,098 A | * | 7/1988 | Ko ................... | 16/29 |
| 5,865,560 A | * | 2/1999 | Mercat et al. .......... | 403/322.4 |
| 6,131,917 A | * | 10/2000 | Walsh .................. | 280/43.1 |
| 6,276,760 B1 | * | 8/2001 | Everett ................. | 301/124.2 |
| 6,641,228 B2 | * | 11/2003 | Liu .................... | 301/111.06 |
| 6,719,319 B2 | * | 4/2004 | Liao .................... | 280/654 |
| 6,739,616 B2 | * | 5/2004 | Lin .................... | 280/642 |

* cited by examiner

*Primary Examiner*—Christopher P. Ellis
*Assistant Examiner*—John R. Olszewski
(74) *Attorney, Agent, or Firm*—Alan Kamrath; Kamrath & Associates PA

(57) ABSTRACT

A detachable device for an auxiliary wheel of a golf cart includes a main body, an auxiliary wheel unit, and a drive handle. The auxiliary wheel unit includes a wheel support rack, and auxiliary wheel and a plastic block. The auxiliary wheel unit is mounted on and detached from the main body by the pivot action of the drive handle, thereby facilitating a user mounting and folding the auxiliary wheel unit. Thus, the detachable device is operated to mount and fold the auxiliary wheel unit easily, rapidly and conveniently, thereby facilitating the user operating the detachable device.

2 Claims, 13 Drawing Sheets

DETACHABLE DEVICE FOR AUXILIARY WHEEL OF GOLF CART

BACKGROUND OF THE INVENTION

1. Field of the Invention

The present invention relates to a detachable device, and more particularly to a detachable device for an auxiliary wheel of a golf cart.

2. Description of the Related Art

A conventional golf cart in accordance with the prior art shown in FIGS. 9 and 10 comprises a frame 10A, a support lever 20A having a first end pivotally mounted on the frame 10A by a bolt 201, and an auxiliary wheel 202 rotatably mounted on a second end of the support lever 20A. However, a user has to screw the bolt 201 to lock the support lever 20A on the frame 10A and to unscrew the bolt 201 to unlock the support lever 20A from the frame 10A, thereby causing inconvenience to the user. In addition, when the frame 10A is folded as shown in FIG. 10, the folded frame 10A has a larger volume due to existence of the auxiliary wheel 202 and the support lever 20A, thereby causing inconvenience in storage, package and transportation of the golf cart.

Another conventional golf cart in accordance with the prior art shown in FIGS. 11–13 comprises a frame 10B, a support lever 20B having a first end detachably mounted on the frame 10B, an auxiliary wheel 204 rotatably mounted on a second end of the support lever 20B, and a locking device 30 mounted between the frame 10B and the support lever 20B and including a socket 301 secured on the frame 10B for slidably mounting the support lever 20B, and an elastic snapping member 302 secured on the support lever 20B and detachably locked in the socket 301. Thus, when the snapping member 302 is pressed inward to detach from the socket 301, the support lever 20B is removed from the frame 10B. However, the socket 301 needs to have a larger clearance to allow sliding movement of the support lever 20B, so that gaps "a" and "b" are defined between the support lever 20B and the socket 301, thereby increasing costs of fabrication. In addition, the snapping member 302 and the support lever 20B are loosely mounted on the socket 301, so that the support lever 20B easily vibrates or deflects, thereby affecting movement of the auxiliary wheel 204.

SUMMARY OF THE INVENTION

The primary objective of the present invention is to provide a detachable device for an auxiliary wheel of a golf cart.

Another objective of the present invention is to provide a detachable device that is operated to mount and fold the auxiliary wheel unit easily, rapidly and conveniently, thereby facilitating a user operating the detachable device.

A further objective of the present invention is to provide a detachable device, wherein the auxiliary wheel unit is mounted on and detached from the main body easily, rapidly and conveniently by the pivot action of the drive handle, thereby facilitating the user mounting and folding the auxiliary wheel unit.

A further objective of the present invention is to provide a detachable device, wherein the auxiliary wheel unit is removed from the frame of the golf cart, so that the frame of the golf cart is folded completely to have the minimum volume when not in use, thereby facilitating storage, package and transportation of the golf cart.

Further benefits and advantages of the present invention will become apparent after a careful reading of the detailed description with appropriate reference to the accompanying drawings.

DETAILED DESCRIPTION OF THE INVENTION

Figure 1:
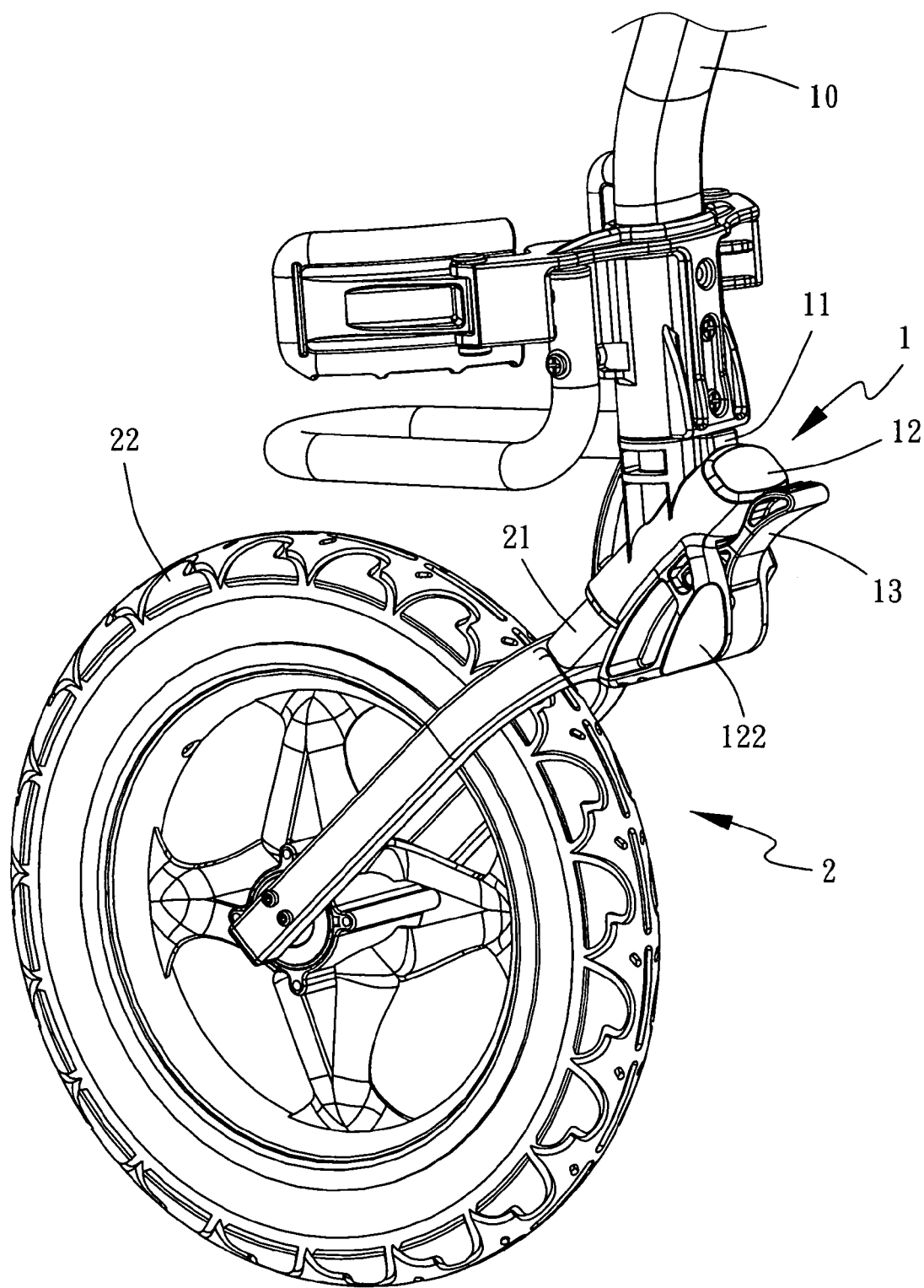
FIG. 1 is a perspective view of a detachable device in accordance with the preferred embodiment of the present invention.
Figure 2:
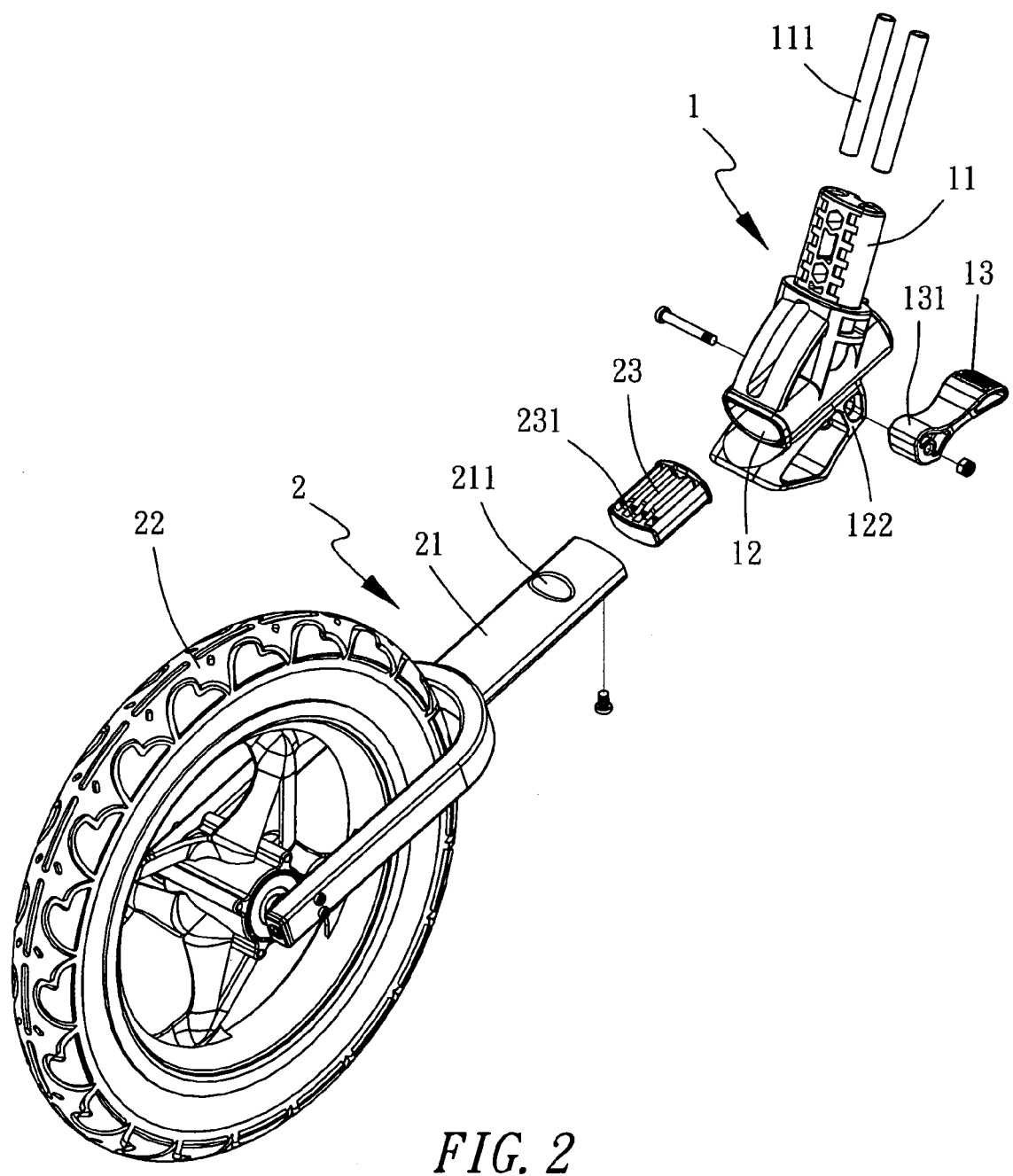
FIG. 2 is an exploded perspective view of the detachable device as shown in FIG. 1.
Figure 3:
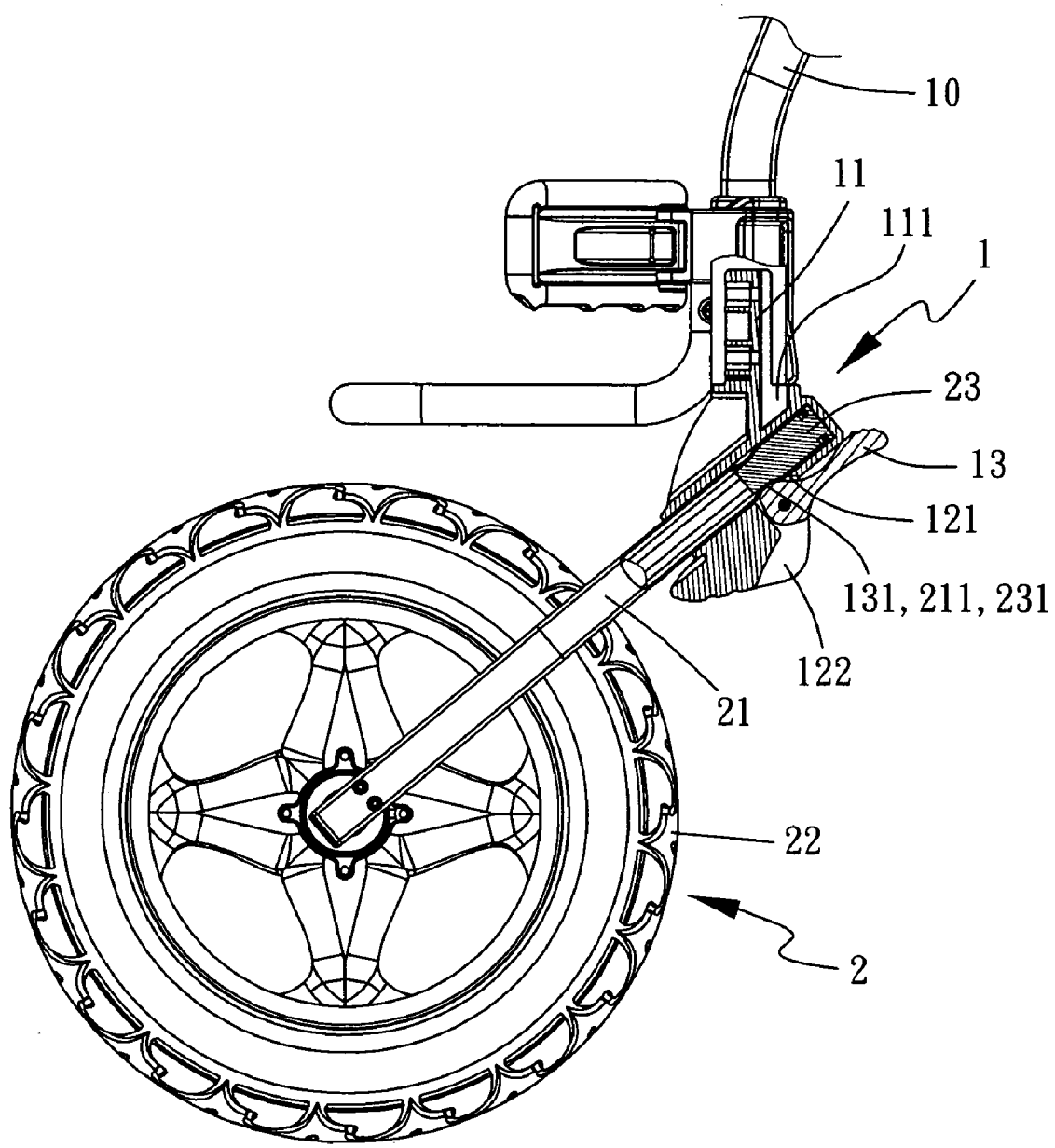
FIG. 3 is a partially side plane cross-sectional view of the detachable device as shown in FIG. 1.

Referring to the drawings and initially to FIGS. 1-3, a detachable device in accordance with the preferred embodiment of the present invention comprises a main body 1 having an inside formed with a mounting recess 12 and a peripheral wall formed with a through hole 121 (see FIG. 3) communicating with the mounting recess 12, an auxiliary wheel unit 2 mounted on the main body 1 and including a wheel support rack 21 and a plastic block 23 mounted on a first end of the wheel support rack 21, detachably inserted into the mounting recess 12 of the main body 1 and having a peripheral wall formed with a locking groove 231 aligning with the through hole 121 of the main body 1, and a drive handle 13 pivotally mounted on the main body 1 eccentrically and having an end formed with an eccentric urging portion 131 eccentrically extended through the through hole 121 of the main body 1 and locked in the locking groove 231 of the plastic block 23 of the auxiliary wheel unit 2 to fix the auxiliary wheel unit 2 on the main body 1.

The main body 1 has a top formed with a locking stud 11 mounted on a frame 10 of a golf cart. The locking stud 11 of the main body 1 is inclined relative to the mounting recess 12 and has an inside provided with two metallic reinforcement rods 111. The peripheral wall of the main body 1 is formed with a hollow pivot base 122, and the drive handle 13 is pivotally mounted in the pivot base 122 of the main body 1 eccentrically. Preferably, the urging portion 131 of the drive handle 13 has a cylindrical shape and is mounted in the pivot base 122 of the main body 1 eccentrically.

The wheel support rack 21 of the auxiliary wheel unit 2 has a hollow shape. The plastic block 23 is inserted into the first end of the wheel support rack 21, and the first end of the wheel support rack 21 of the auxiliary wheel unit 2 is detachably inserted into the mounting recess 12 of the main body 1. The first end of the wheel support rack 21 of the auxiliary wheel unit 2 has a peripheral wall formed with a through hole 211 aligning with the locking groove 231 of the plastic block 23 and the through hole 121 of the main body 1 to allow passage of the urging portion 131 of the drive handle 13. The auxiliary wheel unit 2 further includes an auxiliary wheel 22 rotatably mounted on a second end of the wheel support rack 21.

As shown in FIG. 3, the locking stud 11 of the main body 1 is fixed on the frame 10 of the golf cart, so that the main body 1 is attached on the frame 10 of the golf cart. Then, the wheel support rack 21 and the plastic block 23 of the auxiliary wheel unit 2 are inserted into the mounting recess 12 of the main body 1 until the through hole 211 of the wheel support rack 21 and the locking groove 231 of the plastic block 23 are aligned with the through hole 121 of the main body 1. Then, when the drive handle 13 is pivoted on the main body 1, the urging portion 131 of the drive handle 13 is eccentrically extended through the through hole 121 of the main body 1 and the through hole 211 of the wheel support rack 21 and locked in the locking groove 231 of the plastic block 23 to fix the auxiliary wheel unit 2 on the main body 1, so that the auxiliary wheel unit 2 and the main body 1 are attached on the frame 10 of the golf cart.

Figure 4:
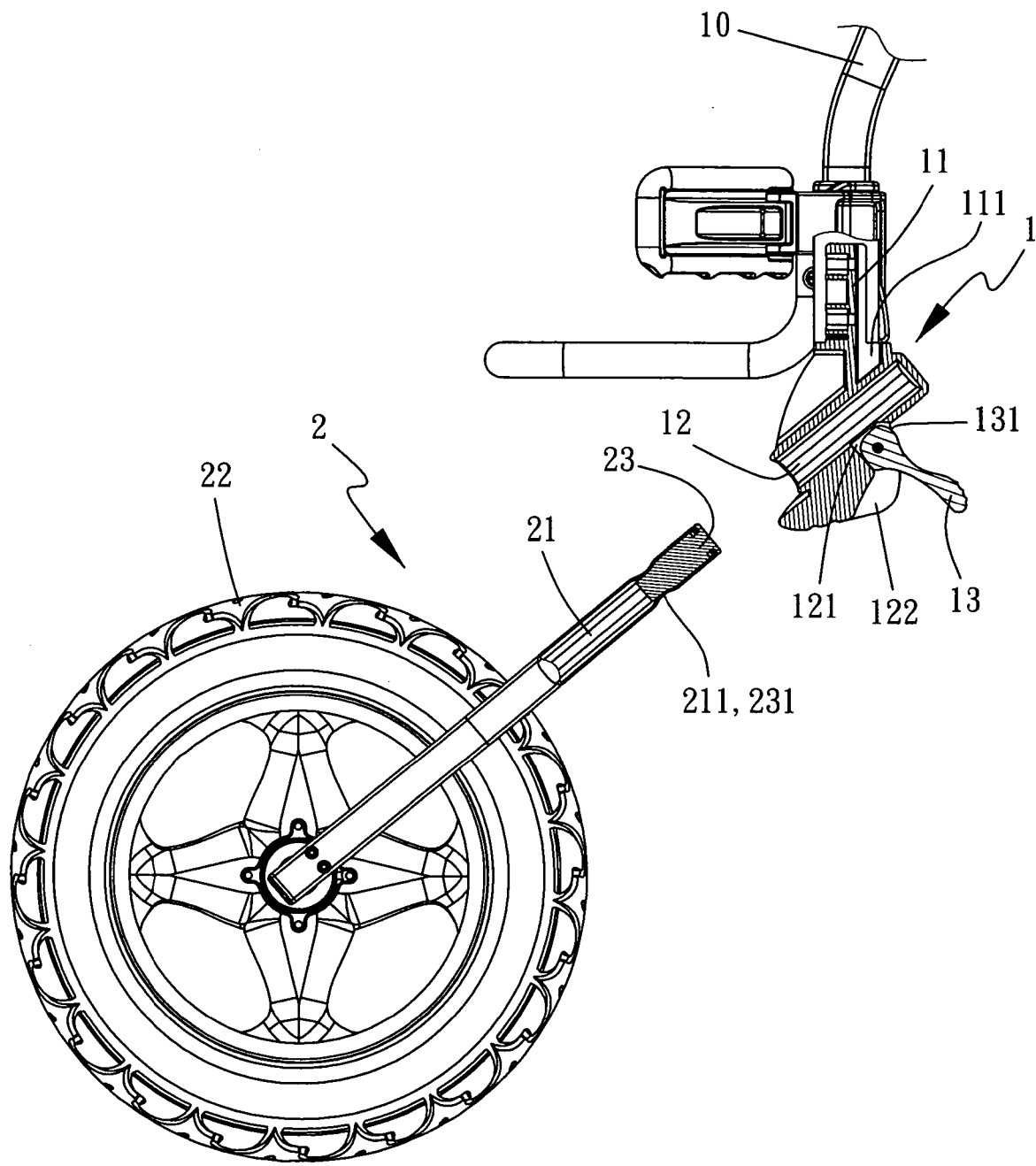
FIG. 4 is a schematic operational view of the detachable device as shown in FIG. 3.

As shown in FIG. 4, when the drive handle 13 is pivoted on the main body 1 in an opposite direction, the urging portion 131 of the drive handle 13 is detached from the locking groove 231 of the plastic block 23 and the through hole 211 of the wheel support rack 21 to release the auxiliary wheel unit 2 from the main body 1, so that the auxiliary wheel unit 2 is removed from the main body 1.

Figure 5:
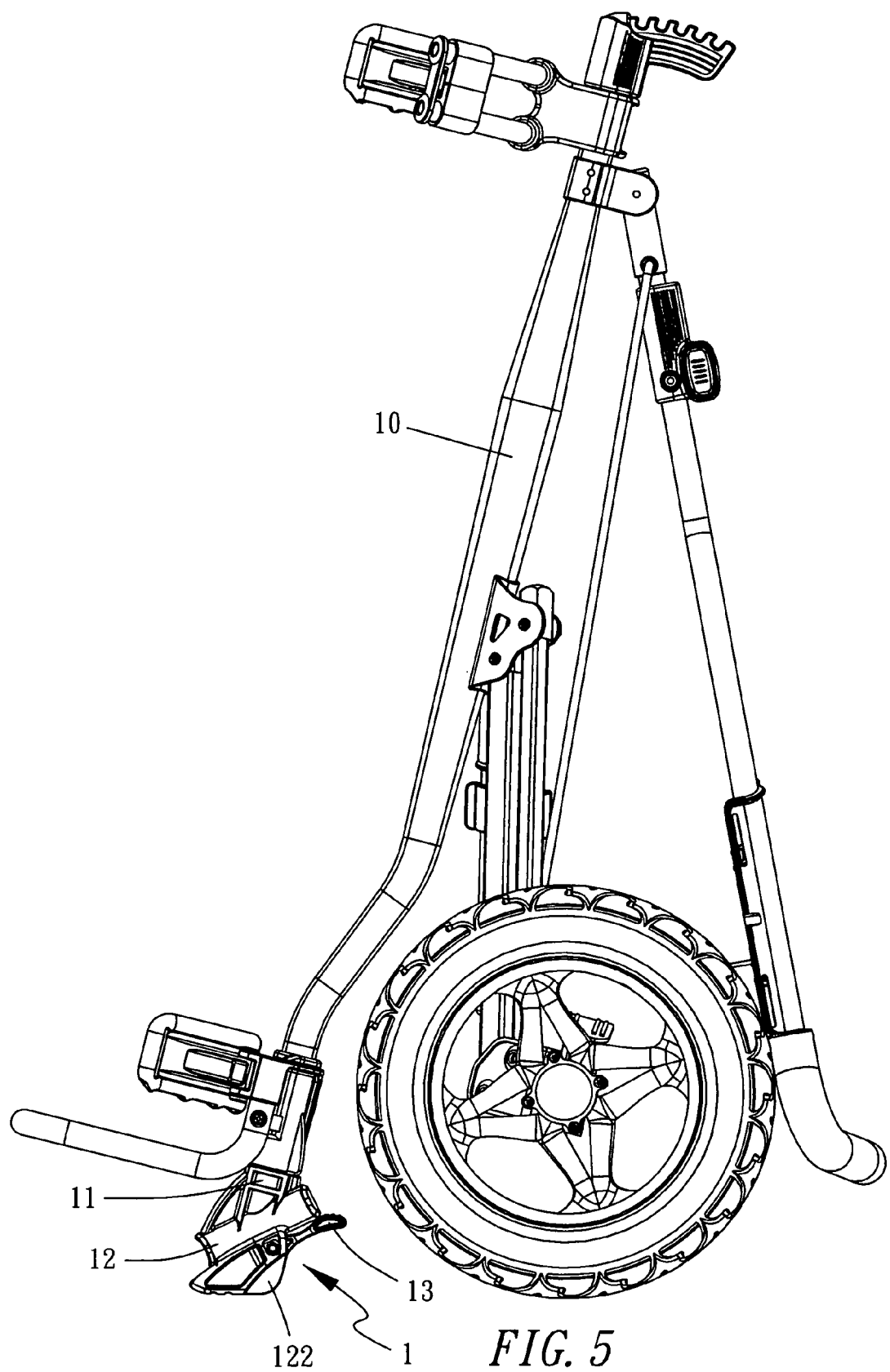
FIG. 5 is a plane folded view of the detachable device as shown in FIG. 1.

As shown in FIG. 5, after the auxiliary wheel unit 2 is removed from the main body 1, the frame 10 of the golf cart is folded to have the minimum volume.

Figure 6:
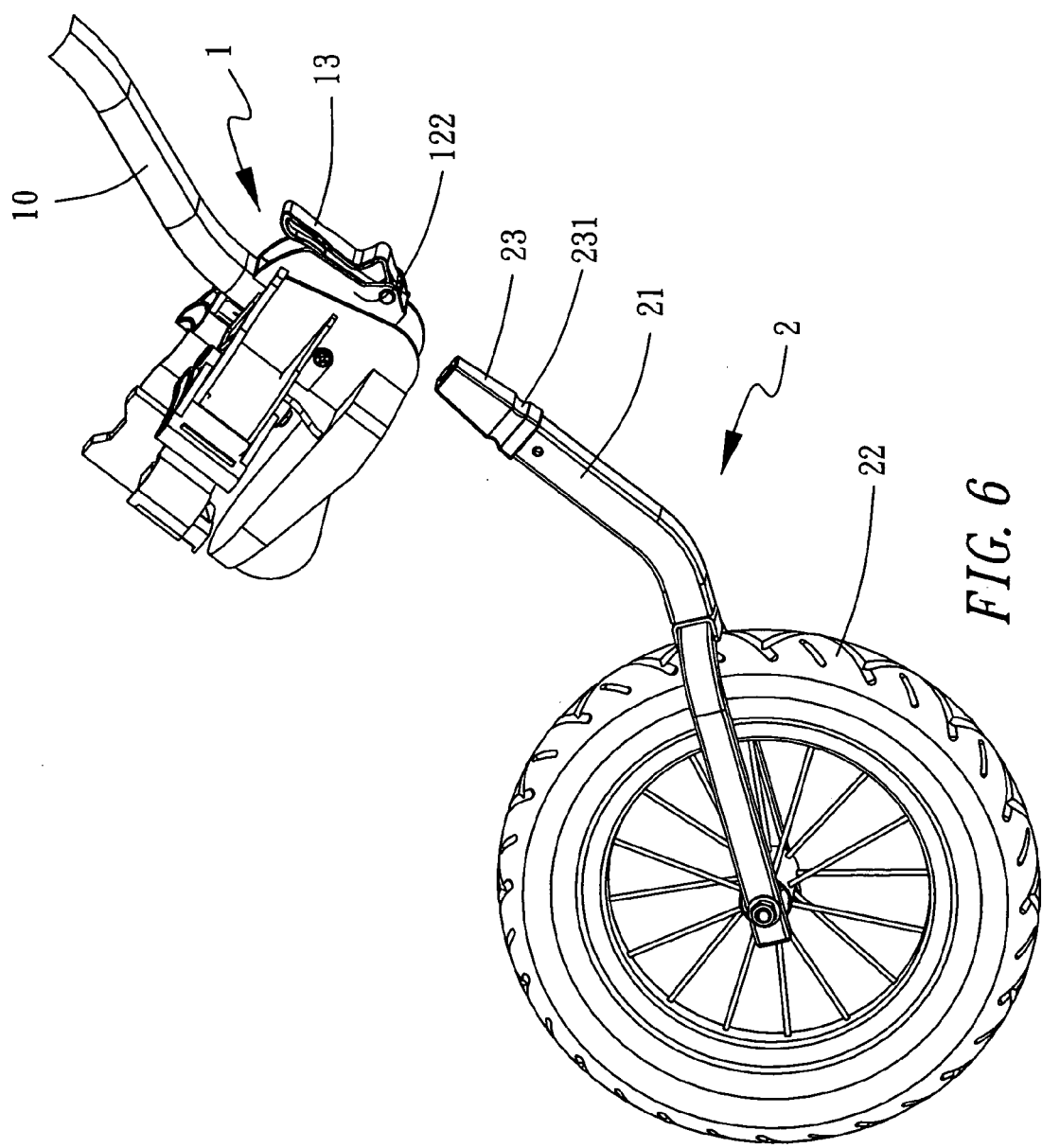
FIG. 6 is a partially exploded perspective view of a detachable device in accordance with another embodiment of the present invention.
Figure 7:
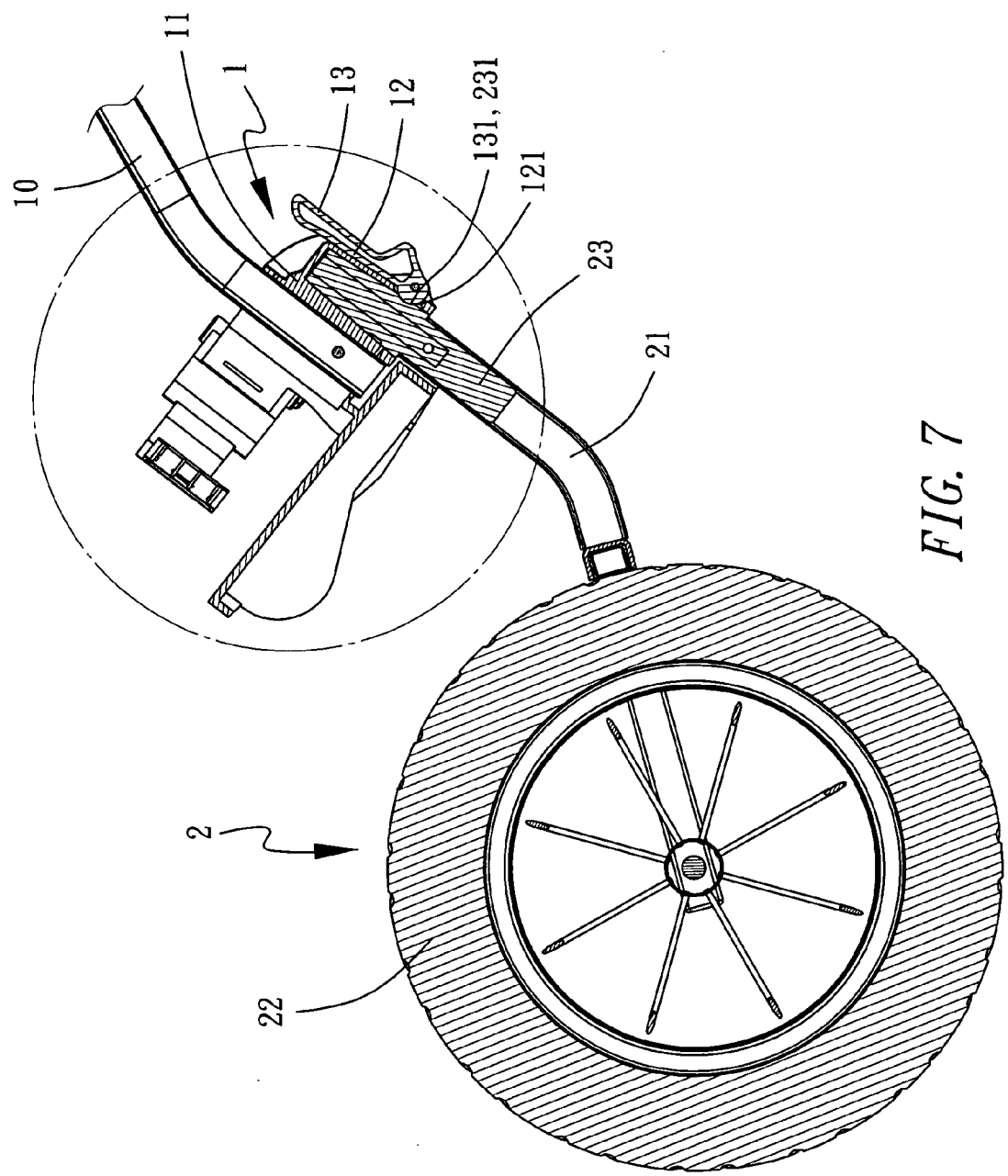
FIG. 7 is a partially side plane cross-sectional assembly view of the detachable device as shown in FIG. 6.
Figure 8:
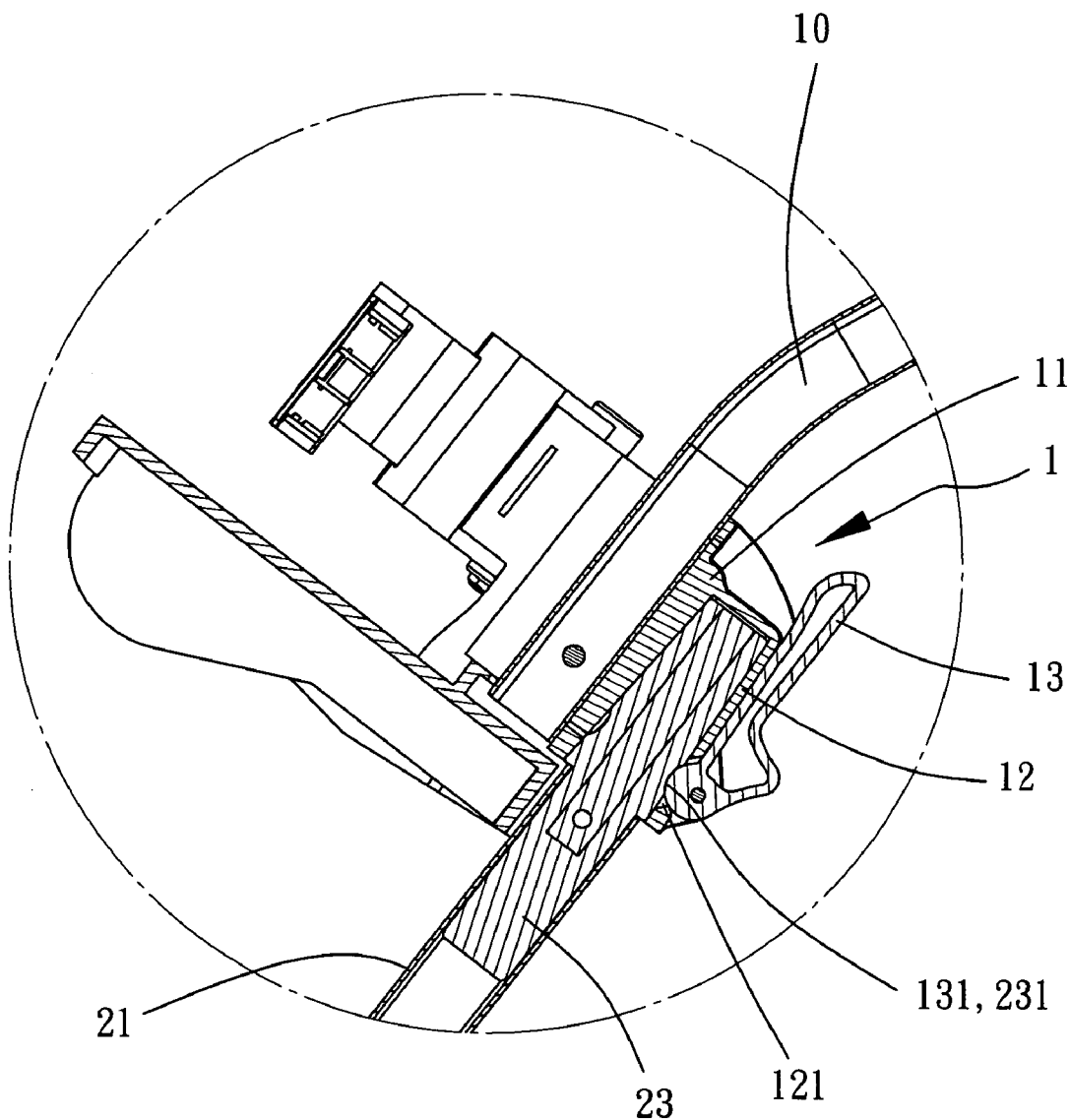
FIG. 8 is a partially enlarged view of the detachable device as shown in FIG. 7.
Figure 9:
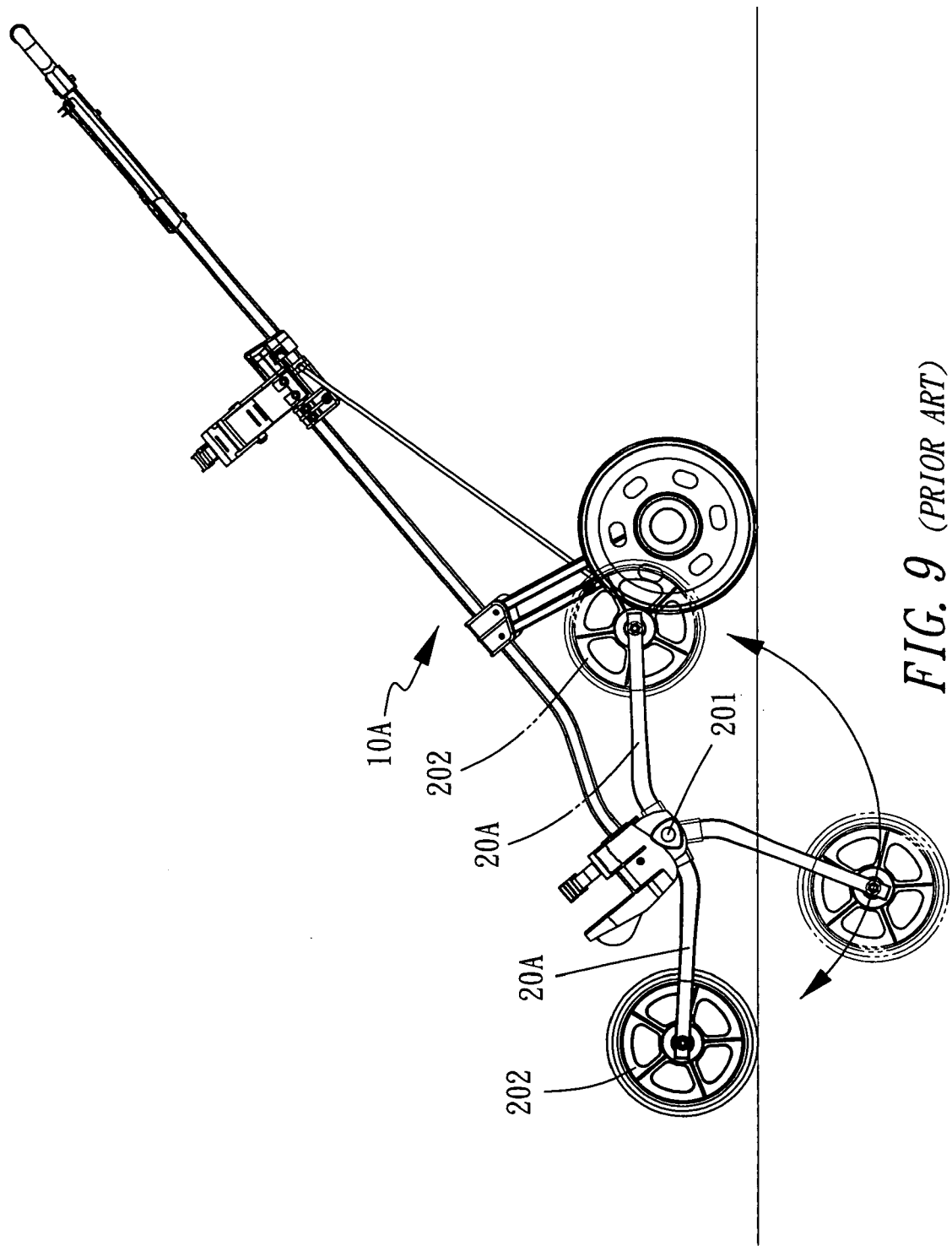
FIG. 9 is a side plane operational view of a conventional golf cart in accordance with the prior art.
Figure 10:
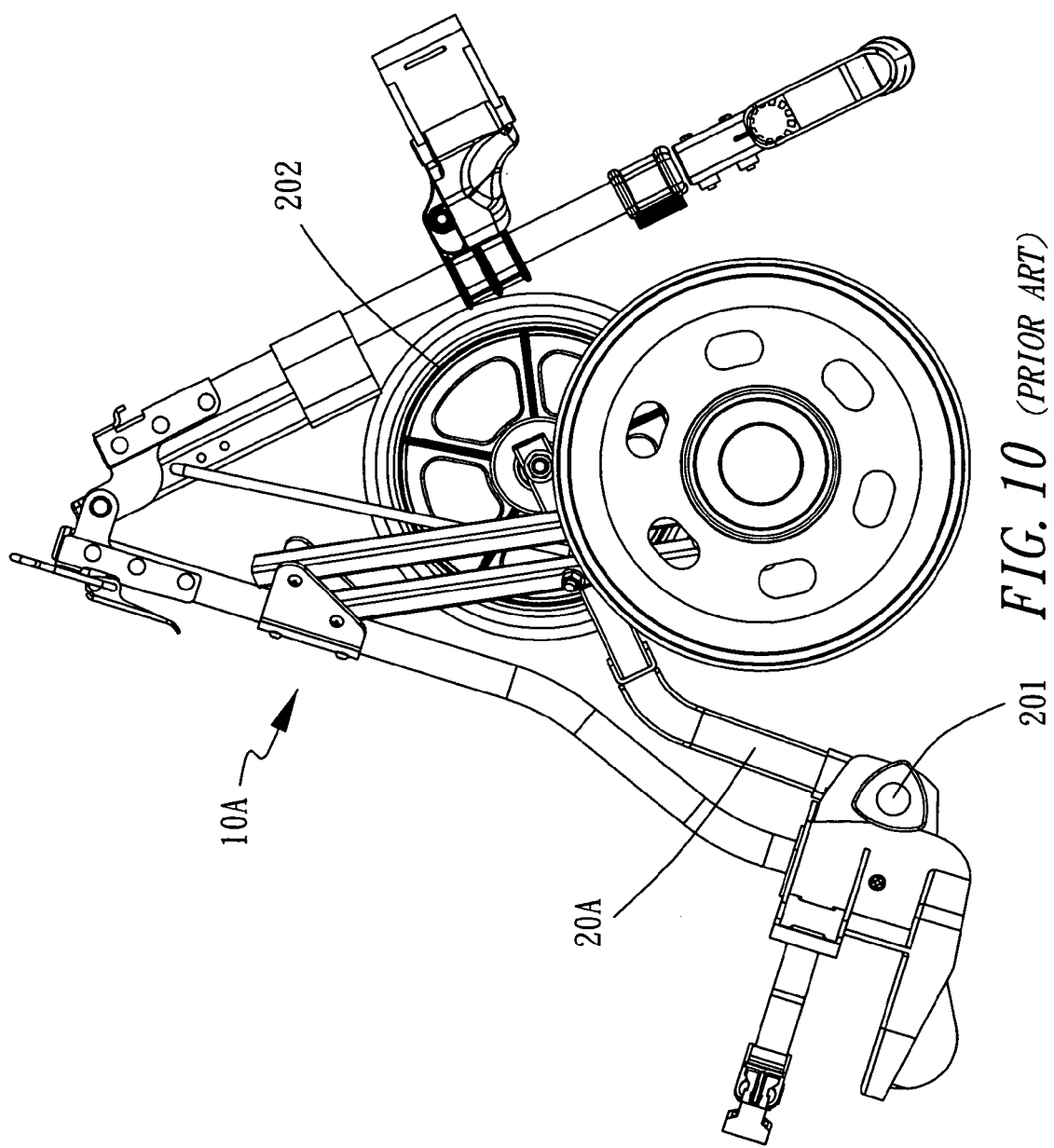
FIG. 10 is an enlarged folded view of the conventional golf cart as shown in FIG. 9.
Figure 11:
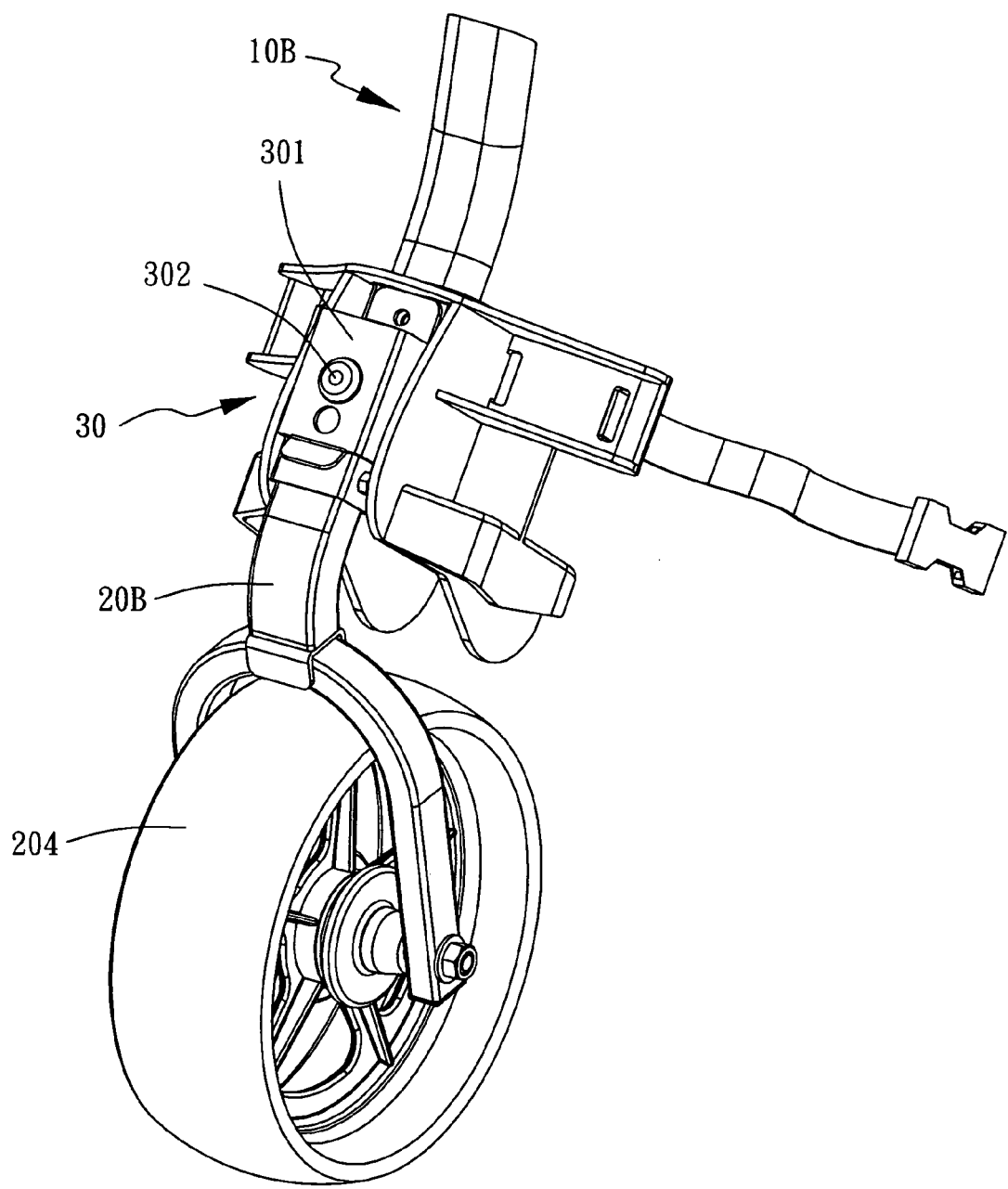
FIG. 11 is a perspective view of another conventional golf cart in accordance with the prior art.
Figure 12:
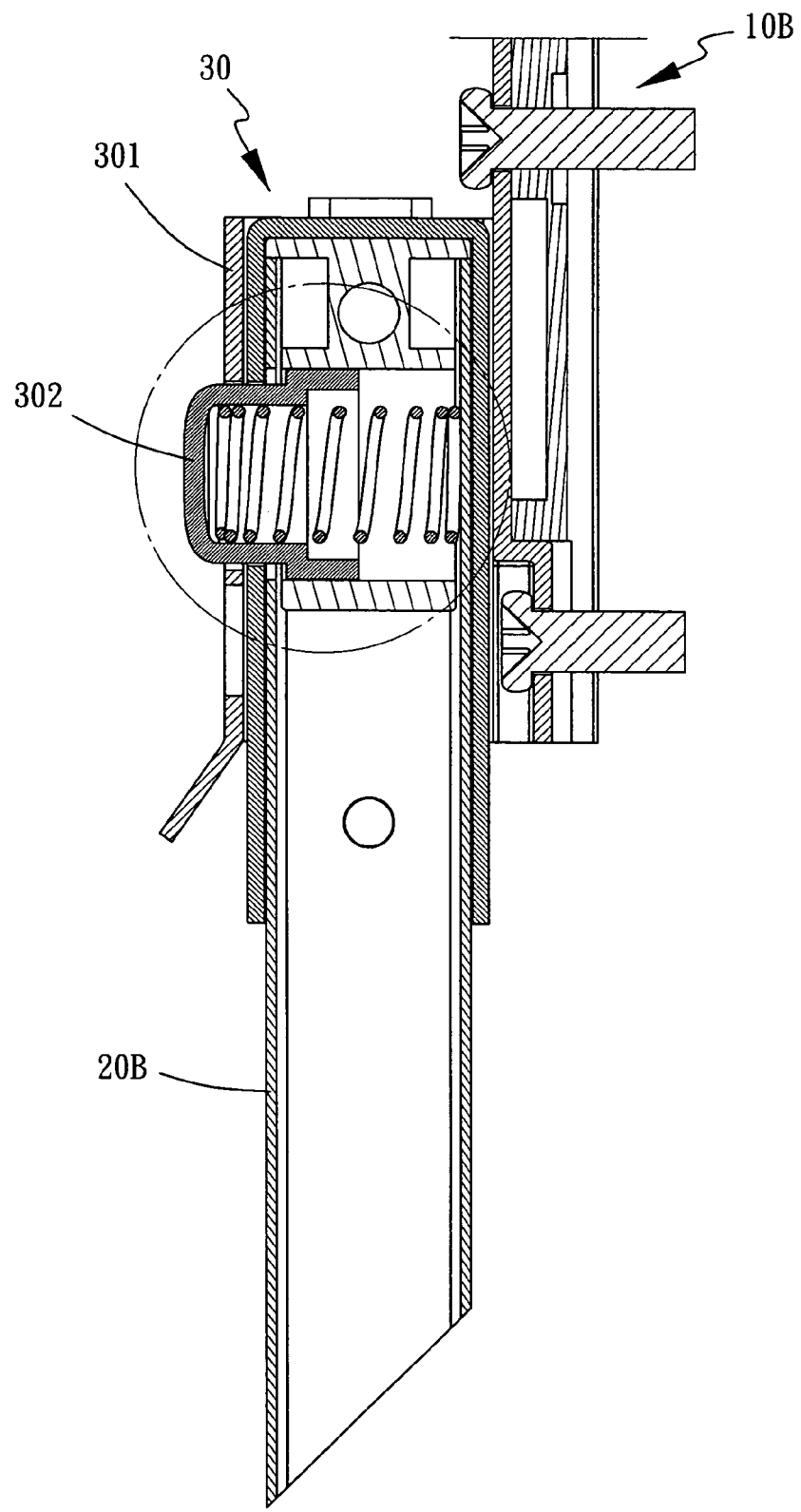
FIG. 12 is a plane cross-sectional view of the conventional golf cart as shown in FIG. 11.
Figure 13:
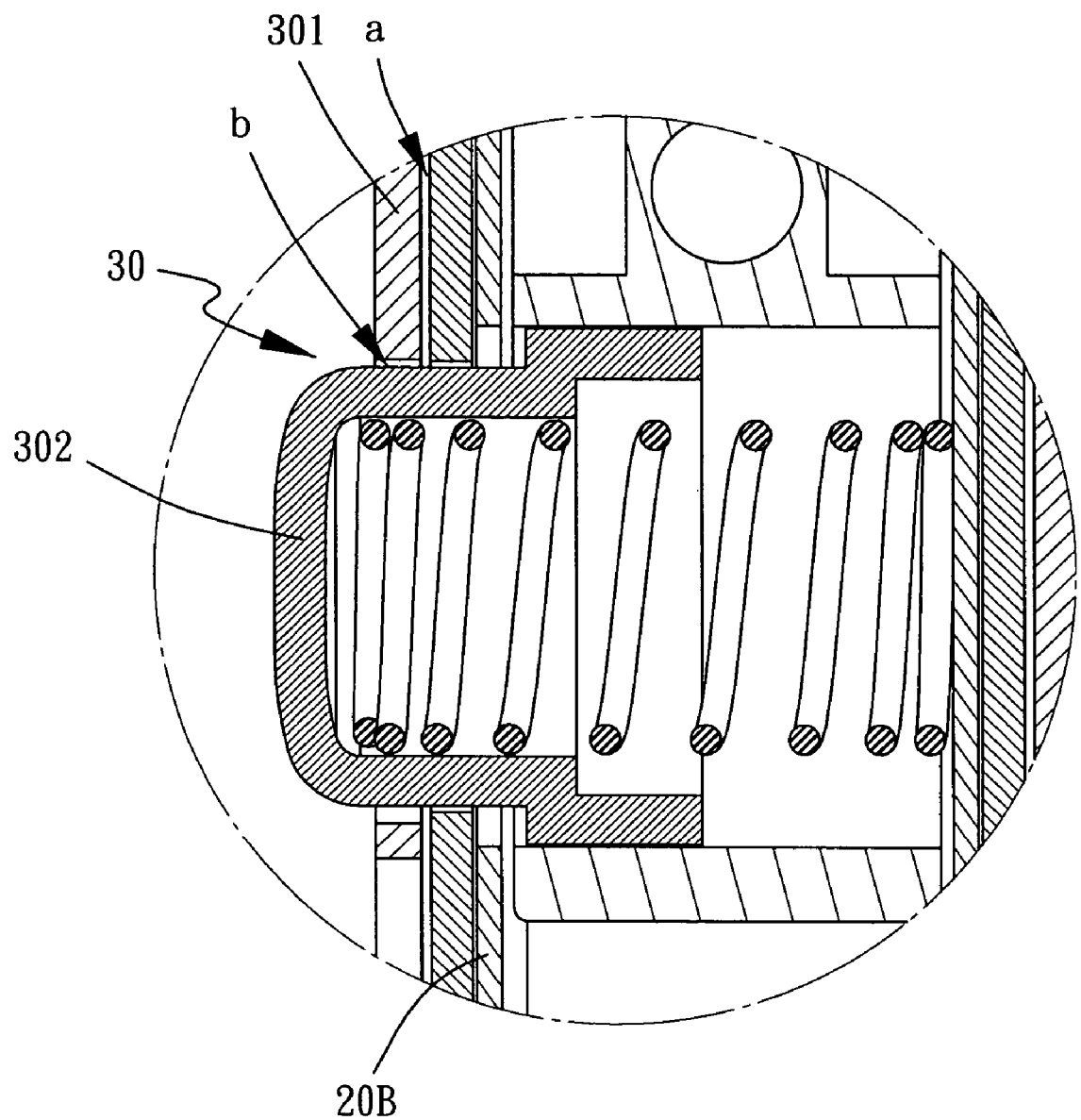
FIG. 13 is a partially enlarged view of the golf cart as shown in FIG. 12.

Referring to FIGS. 6–8, the plastic block 23 of the auxiliary wheel unit 2 has a first end inserted into the first end of the wheel support rack 21 and a second end protruded outward from the wheel support rack 21 and detachably inserted into the mounting recess 12 of the main body 1, and the locking groove 231 of the plastic block 23 is formed in the second end of the plastic block 23. Thus, the first end of the wheel support rack 21 of the auxiliary wheel unit 2 is located outside of the mounting recess 12 of the main body 1.

Accordingly, the auxiliary wheel unit 2 is mounted on and detached from the main body 1 easily, rapidly and conveniently by the pivot action of the drive handle 13, thereby facilitating a user mounting and folding the auxiliary wheel unit 2. In addition, the auxiliary wheel unit 2 is removed from the frame 10 of the golf cart, so that the frame 10 of the golf cart is folded completely to have the minimum volume when not in use, thereby facilitating storage, package and transportation of the golf cart.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A detachable device, comprising a main body and an auxiliary wheel unit, wherein:

the main body is fixed on a bottom of a golf cart and has an inside formed with a mounting recess which has an opening directed downward, the mounting recess has a rear sidewall formed with a through hole, a drive handle is pivotally mounted on the rear sidewall of the mounting recess eccentrically, the drive handle has an end formed with an eccentric cylindrical urging portion pivotally extended through the through hole of the main body into the mounting recess;

the auxiliary wheel unit includes a wheel support rack and an auxiliary wheel, the wheel support rack is extended upward and has a hollow shape, the wheel support rack has a top end provided with a plastic block which is inserted into the mounting recess of the main body, the plastic block is formed with a locking groove aligning with the through hole of the mounting recess;

wherein when the plastic block at the top end of the wheel support rack is inserted into the mounting recess of the main body, the drive handle is driven so that the urging portion of the drive handle is eccentrically extended through the through hole of the mounting recess and locked in the locking groove of the plastic block to form a close combination state, so that the auxiliary wheel unit is attached to the bottom of the golf cart and can be detached and assembled easily.

2. The detachable device in accordance with claim 1, wherein the plastic block at the top end of the wheel support rack is inserted into an inside of the wheel support rack, the top end of the wheel support rack is formed with a through hole aligning with the locking groove of the plastic block and the through hole of the mounting recess, and the urging portion of the drive handle is extended through the through hole of the mounting recess and locked in the through hole of the wheel support rack and the locking groove of the plastic block.

* * * * *